United States Patent [19]

Martinsson et al.

[11] Patent Number: 5,595,378
[45] Date of Patent: Jan. 21, 1997

[54] CLAMPING JAW

[75] Inventors: Lars M. R. Martinsson; Jan-Olof Hemmervall, both of Robertsfors, Sweden

[73] Assignee: Cue Dee Produkter AB, Robertsfors, Sweden

[21] Appl. No.: 347,382

[22] PCT Filed: Jun. 9, 1993

[86] PCT No.: PCT/SE93/00512

§ 371 Date: Feb. 3, 1995

§ 102(e) Date: Feb. 3, 1995

[87] PCT Pub. No.: WO93/25821

PCT Pub. Date: Dec. 23, 1993

[30] Foreign Application Priority Data

Jun. 9, 1992 [SE] Sweden ................................ 9201757

[51] Int. Cl.⁶ ........................................................ B25B 1/02
[52] U.S. Cl. ................ 269/210; 269/37; 269/41; 269/43; 269/45; 269/268; 269/287; 269/152; 269/902
[58] Field of Search ................................. 248/74.1, 68.1; 269/43, 902, 910, 207, 152, 37, 41, 45, 268, 287; 29/272

[56] References Cited

U.S. PATENT DOCUMENTS 2,492,558  12/1949  Deubler .................................. 269/282
4,444,370   4/1984  Krueger .
4,736,935   4/1988  Vasapolli .............................. 269/210
5,274,888   1/1994  Payne ................................... 248/74.1

FOREIGN PATENT DOCUMENTS 1443185   4/1965  France ................................. 269/210
 208239   1/1940  Switzerland ......................... 248/68.1
 546350   2/1974  Switzerland .
2013818   8/1979  United Kingdom .
1591371   6/1981  United Kingdom .

*Primary Examiner*—Robert C. Watson
*Attorney, Agent, or Firm*—Browdy and Neimark

[57] ABSTRACT

A clamping jaw (10) for a clamping device, adapted to be mounted on a profile member (31) is formed by two separate jaw members (11) and a common rear counter support (12) for said members, which is arranged to transmit clamping forces produced by means of clamping bolts (32) to the two jaw members (11). The jaw members (11) and the counter support (12) have cooperating engagement means (13, 15) for placing and holding the jaw members (11) in predetermined positions in relation to the counter support (12). In order to make it possible to adapt the clamping jaw (10) to profile members of different shape and size, the engagement means (13, 15) are arranged to permit each jaw member (11) to be placed and held in a plurality of different positions in relation to the counter support (12).

26 Claims, 3 Drawing Sheets

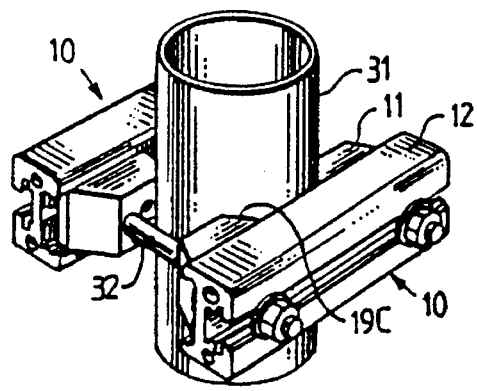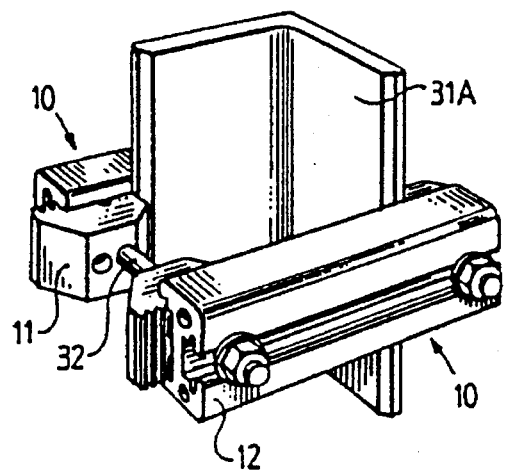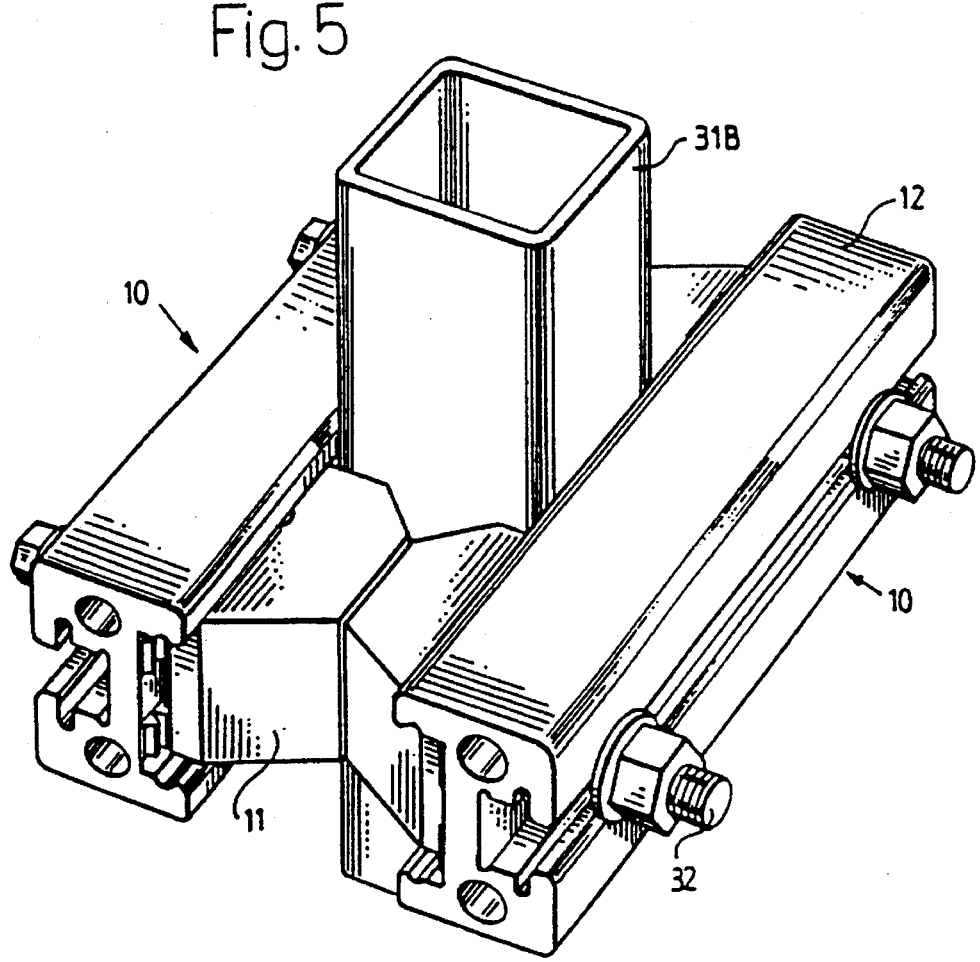

CLAMPING JAW

BACKGROUND OF THE INVENTION

1. Technical Field of the Invention

The present invention relates to a clamping jaw.

More particularly, the invention relates to a clamping jaw for a clamping device of the kind, adapted to be mounted on a profile member and wherein the clamping jaw may be applied under pressure against the profile member by means of two transverse clamping bolts, placed each on one side of the profile member.

2. Prior Art

Such clamping devices are utilized as attachment means for profile members of many different kinds. For instance, they are utilized in connection with the attachment of profile members to buildings or the like and for mounting antennas on such members. Normally, the clamping device comprises two opposite clamping jaws, which may be applied under pressure against mutually opposite sides of a profile member by means of the two clamping bolts, which are placed each on one side of said member. However, in some cases, one clamping jaw may be replaced by a fixed building portion or the like, in which the two clamping bolts are anchored in a suitable manner.

In most clamping devices of the above kind previously known, the clamping jaw or each clamping jaw, respectively, is formed by a member, made in one single piece and having a shape and size adapted to the intended profile member.

However, through U.S. Pat. No. 4,444,370, it is also known, in a clamping device of said kind, to utilize a clamping jaw formed by two separate jaw members and a common counter support for said members, located behind them and arranged to transmit the clamping forces produced by means of the clamping bolts to the two jaw members in order to press said members against the profile member. The two jaw members and the counter support are provided with cooperating engagement means, serving to make it possible to place and hold the jaw members in predetermined positions in relation to the counter support.

According to said patent specification, the main reason for dividing a clamping jaw into three different portions, namely two separate jaw members and a common rear counter support for said members, is to facilitate the manufacture as well as the use of the clamping jaw when it has very large dimensions and forms part of a clamping device for pipes of very large diameter.

A disadvantage of the clamping jaw disclosed in the above-mentioned U.S. patent specification as well as of an ordinary clamping jaw, made in one single piece, is that the clamping jaw is suited to be mounted only on profile members having dimensions and shapes varying within rather narrow limits. Therefore, in order to meet the need for clamping devices for various kinds of profile members of strongly varying size and shape, it has previously been necessary to provide a large number of different clamping jaws of different shape and size.

OBJECTIVE AND SUMMARY OF THE INVENTION

The invention has for its purpose to provide an improved clamping jaw of the kind previously known through U.S. Pat. No. 4,444,370, which makes it possible to use one and the same clamping jaw in connection with many different kinds of profile members exhibiting large variations with respect to their dimensions and shapes.

In accordance with the invention, the clamping jaw proposed for said purpose is characterized in that the engagement means are arranged to permit each jaw member to be placed and held in a position in relation to the counter support which may be freely selected among a plurality of different predetermined positions.

Hereby, the clamping jaw according to the invention may easily be adapted to the profile member on which it is intended to be mounted. This means that it differs fundamentally from the clamping jaw disclosed in the above-mentioned U.S. patent specification, where each jaw member may be placed only in a single predetermined position at the counter support and where it is therefore impossible to adapt the clamping jaw to different profile members.

The engagement means should preferably be arranged to permit the jaw members to be placed and held in differently spaced apart positions at the counter support. However, the engagement means may also be arranged to permit the jaw members to be placed in positions in which they are facing each other with first ends thereof, as well as in a position, in which they are facing each other with second ends thereof, opposite to the first ends. In this case, the jaw members may be provided with contact surfaces of mutually different shape for application against a profile member at their said first and second ends. Hereby, the clamping jaw may be adapted to the profile member in question also by placing the jaw members so as to face each other with the contact surfaces thereof most suited for this profile member.

In a preferred embodiment of the invention, the engagement means comprise transverse teeth at the rear side of each jaw member and cooperating transverse teeth at the front side of the counter support. This design of the engagement means permits the jaw members to be placed in a great number of different positions at the counter support and facilitates also placing them in a turnable state at the counter support. In order to prevent any lateral displacement of the jaw members relatively to the counter support, at its front side, the counter support may be provided with two flanges, projecting in a forward direction therefrom and forming a pair of opposite longitudinal guide surfaces for two opposite longitudinal lateral surfaces of each jaw member.

Moreover, in order to facilitate its handling, the clamping jaw may suitably comprise locking means for releasably locking the jaw members in positions in which the engagement means of said members are in engagement with the engagement means of the counter support. These locking means may comprise locking means, mounted resiliently movable in the jaw members, and longitudinal grooves, formed in said two flanges of the counter support and serving to receive said resiliently movable locking means.

The counter support may suitably be provided with oblong through holes for the clamping bolts in order hereby to facilitate placing said bolts at a variable distance from each other. Oblong through holes for the clamping bolts may be provided also in the jaw members. However, preferably, each jaw member may instead be provided with two through bores for a clamping bolt, located spaced apart in the longitudinal direction of the jaw member.

In order to make it easy to anchor clamping bolts or fastening bolts in the counter support, at its rear side, the counter support may be provided with a longitudinal groove comprising an inner portion, in which a fixed head of a bolt or a nut threaded on a bolt may be received in a non-rotatable state, and an intermediate portion of enlarged width for receiving a washer placed on a bolt, and an outer portion of reduced width forming a free passage for a bolt shank.

BRIEF DESCRIPTION OF THE DRAWINGS

Below the invention is further described with reference to the accompanying drawings, in which:

FIG. 3 shows a perspective view of a clamping device provided with two clamping jaws according to FIGS. 1 and 2, said clamping device being illustrated mounted on a profile member consisting of a cylindrical pipe of circular cross-section, FIG. 4 shows a perspective view of the clamping device according to FIG. 3, illustrating said device mounted on an angle bar, FIG. 5 shows a perspective view of the clamping device according to FIG. 3, illustrating said device mounted on a pipe having an approximately squared cross-section.

In FIGS. 1 and 2, there is shown a clamping jaw, generally designated 10, which comprises two jaw members 11 and a common elongate counter support 12 for said jaw members, by means of which the jaw members 11 may be brought into contact under pressure against a profile member through the action of two transverse clamping bolts, placed each on one side of said profile member.

Figure 1:
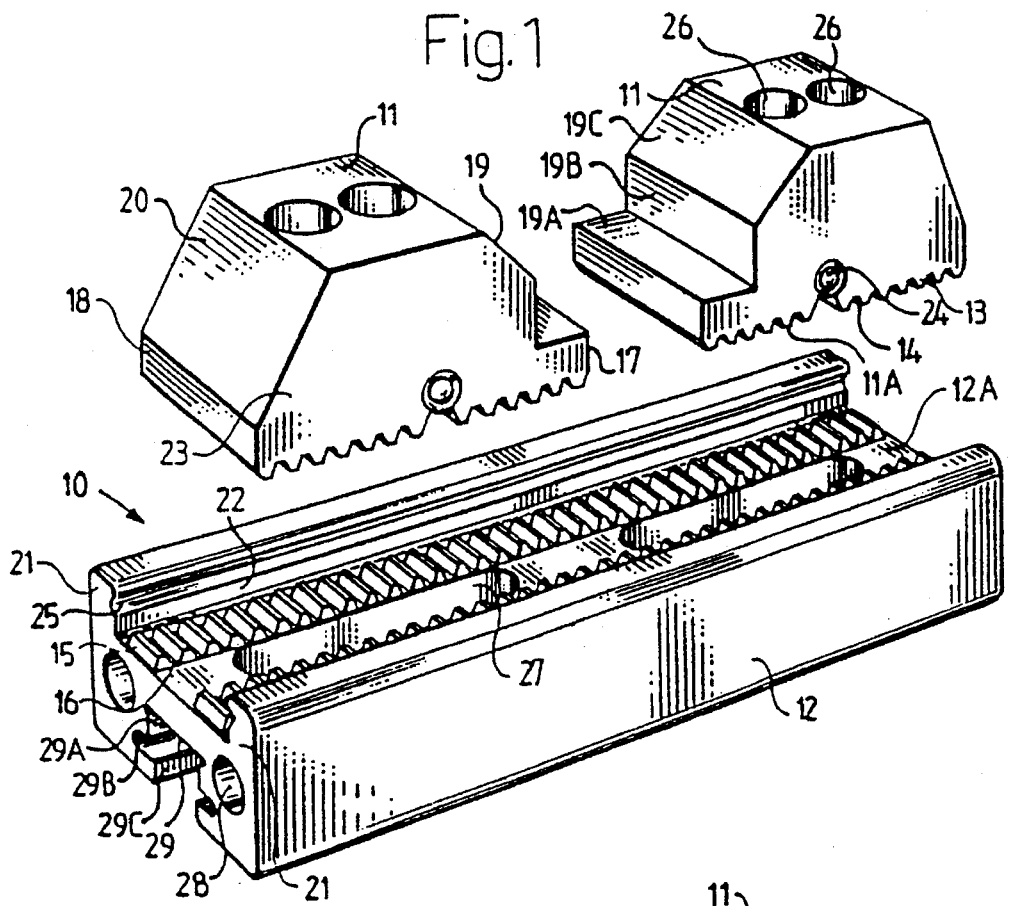
FIG. 1 shows an exploded perspective view of a clamping jaw according to an embodiment of the invention, selected by way of example.

At their rear sides 11A, by means of which they are intended to rest against counter support 12, the jaw members 11 are provided with transverse teeth 13 and intermediate tooth gaps 14, while, at a supporting surface 12A for jaw members 11, provided at the front side of counter support 12 and facing the jaw members, the counter support is provided with two rows of transverse teeth 15 and intermediate tooth gaps 16. Teeth 13 and 15 form cooperating engagement means of jaw members 11 and counter support 12, which may be brought into engagement with each other in order to make it possible to place and hold each jaw member 11 in a position in relation to the counter support which may be freely selected among a plurality of different predetermined positions.

More particularly, teeth 13 and 15 permit the jaw members 11 to be placed at a stepwise variable distance from each other in the longitudinal direction of counter support 12 and also to place the jaw members so as to face each other with first ends 17 thereof or with opposite second ends 18 thereof. In order to take advantage of this possibility of reversing the positions of the jaw members 11 for the purpose of obtaining an improved adaptability of the clamping jaw 10 to profile members of different shape and size, at their said first and second ends 17 and 18, respectively, the jaw members 11 are provided with contact surfaces 19 and 20, respectively, of mutually different shape, intended to be applied against a profile member.

In the illustrated embodiment, contact surface 19 at first end 17 is composed of three surface portions 19A, 19B and 19C. Surface portion 19A extends parallel to the rear side 11A, while surface portion 19B extends perpendicular thereto and surface portion 19C forms an angle of about 45° with the rear side 11A. Contact surface 20 at the second end 18 consists of a single flat surface forming an angle of about 60° with the rear side 11A.

The counter support 12 is provided with two flanges 21 located each at one side of supporting surface 12A and projecting in a forward direction therefrom, said flanges forming a pair of opposite longitudinal guide surfaces 22 for two opposite longitudinal lateral surfaces 23 of each jaw member 11. At each one of its two lateral surfaces 23, each jaw member 11 is provided with a resiliently movable locking ball 24 which projects partially from said surface and which may be brought into engagement with a longitudinal groove 25 in the appurtenant guide surface 22 when the jaw member 11 is pressed in between flanges 21, in order hereby to lock the jaw member releasably in a selected predetermined position, wherein the teeth 13 of the jaw member are received between a number of teeth 15 of counter support 12.

Figure 2:
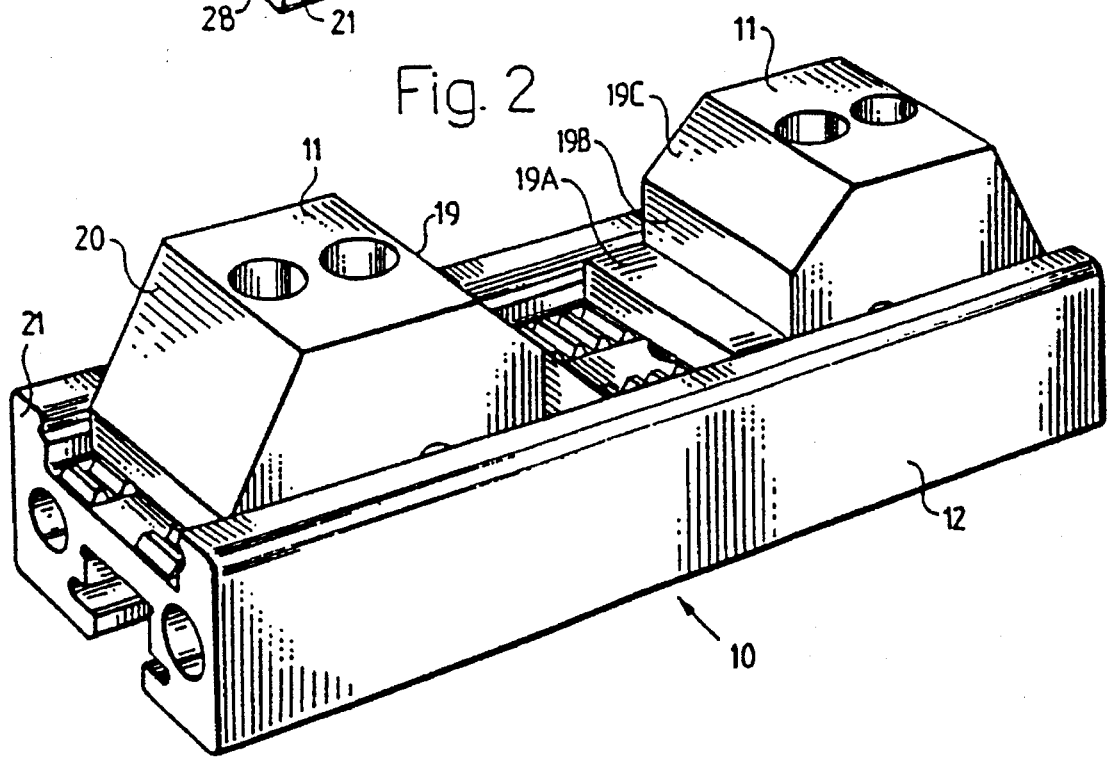
FIG. 2 shows a perspective view of the clamping jaw according to FIG. 1 in an assembled state.

As may be seen from FIGS. 1 and 2, each jaw member 11 is provided with two through bores 26 located at a comparatively short distance from each other in the longitudinal direction of the jaw member. When utilizing clamping jaw 10, a clamping bolt may be inserted through one or the other one of said two bores 26. Counter support 12 has instead two oblong through holes 27, each of which may receive a clamping bolt extending therethrough in a position depending on the selected location of a jaw member 11 and the selected bore 26 in said member.

Furthermore, counter support 12 is provided with two through bores 28, which extend in the longitudinal direction of the counter support and which may be utilized to receive connecting bolts placed therein if it is desired to interconnect two or more counter supports in aligned positions. Additionally, at its rear side, counter support 12 is provided with a longitudinally extending groove 29, comprising an inner portion 29A wherein a hexagonal head of a bolt or a nut threaded on a bolt may be received in a non-rotatable state, and an intermediate portion 29B of enlarged width for receiving a washer placed on said bolt, and an outer portion 29C of reduced width, forming a free passage for the shank of the bolt. A bolt 32 placed in groove 29 and having a hexagonal head 33 has been indicated in dash-dotted lines in FIG. 8.

Jaw members 11 as well as counter support 12 may advantageously be produced at low costs by cutting corresponding blanks from extruded light metal profiles. Upon cutting the blanks intended to form jaw members 11, bores 26 are made in said blanks and prefabricated units comprising locking balls 24 and corresponding springs are mounted in the blanks. In the blank intended to form counter support 12, holes 27 and teeth 15 are produced upon cutting said blank. Teeth 15 may suitably be produced by subjecting portions of supporting surface 12A, intended to form said teeth, to an operation by means of toothed embossing cylinders.

In FIGS. 3–7 various clamping devices provided with clamping jaws according to FIGS. 1 and 2 are shown mounted on different profile members.

FIG. 3 shows a clamping device having two clamping jaws 10, the jaw members 11 of which are held in contact under pressure against a cylindrical pipe 31 of circular cross-section through the action of clamping forces, applied on counter supports 12 by means of two clamping bolts 32.

In this case, jaw members 11 rest against pipe 31 with their contact surface portions 19C.

In FIG. 4 the same clamping device is instead shown mounted on a profile member 31A, consisting of an angle bar, and in FIG. 5 it is shown mounted on a profile member 31B, having the shape of a pipe of approximately squared cross-section. In both these cases, the two contact surface portions 19A and 19B of jaw members 11 are used for holding the profile member in question.

Figure 6:
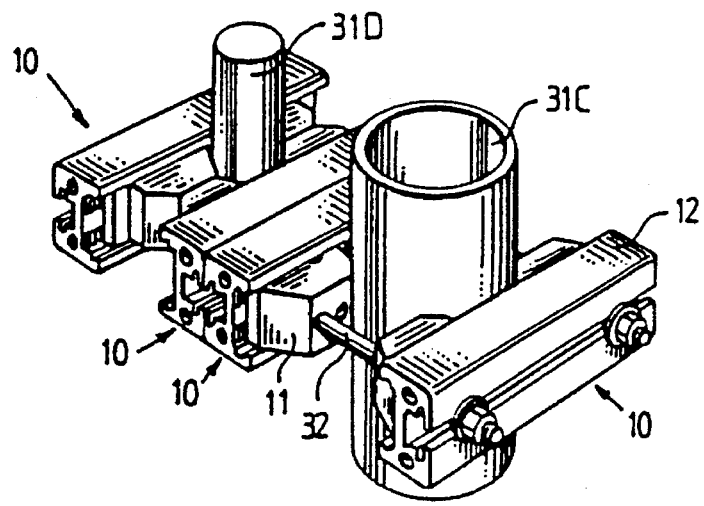
FIG. 6 shows a perspective view of two interconnected clamping devices according to FIG. 3, connecting two parallel vertical tubular profile members to each other.
Figure 8:
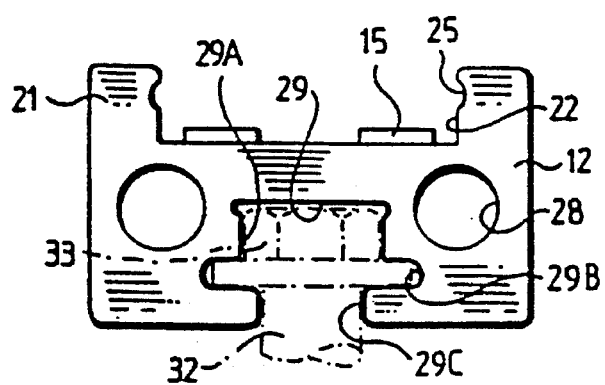
FIG. 8 shows an end view of a counter support forming part of the clamping jaw according to FIGS. 1 and 2.

FIG. 6 illustrates two interconnected clamping devices of the kind shown in FIG. 3, one of said devices being mounted on a pipe 31C of comparatively large diameter, while the other device is mounted on a pipe 31D of comparatively small diameter, extending parallel to pipe 31C. In this case, the clamping bolts 32 of each clamping device are utilized also to hold two counter supports 11, belonging each to one of said clamping devices, firmly resting against each other. At their one ends, the clamping bolts 32 of each clamping device may suitably be provided with fixed hexagonal heads 33 which, as indicated in FIG. 8, are received in groove portion 29A in the adjacent counter support 12 of the other clamping device. As may be seen from FIG. 6, the jaw members 11 applied against the larger pipe 31C rest against said pipe with their contact surfaces 19C, while the jaw members 11 applied against the smaller pipe 31D instead rests against this pipe with their contact surfaces 20.

Figure 7:
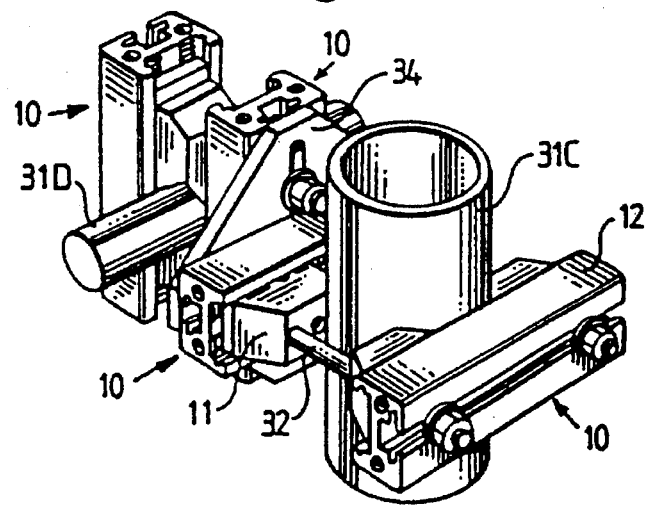
FIG. 7 shows a perspective view of two interconnected clamping devices according to FIG. 3, connecting a horizontal tubular profile member to a vertical tubular profile member.

FIG. 7 shows two clamping devices which are interconnected via an intermediate plate 34 and which serve to connect two mutually perpendicular pipes 31C and 31D to each other.

The invention is not restricted to the embodiment above described and shown in the drawings. Instead, many other embodiments are feasible within the scope of the invention. For instance, it could be mentioned that the contact surfaces 19 and 20 may have other shapes than those shown in the drawings and that the cooperating engagement means of jaw members 11 and counter support 12 do not necessarily need to consist of transverse teeth and intermediate tooth gaps but may instead consist of any other suitable projections and recesses.

We claim:

1. Clamping jaw for a clamping device, adapted to be mounted on a profile member and wherein the clamping jaw (10) is adapted to be applied under pressure against the profile member (31) by means of two transverse clamping bolts (32), placed each on one side of the profile member, clamping jaw (10) being formed by two separate jaw members (11) and a common counter support (12) for each member of said jaw members, located behind them and arranged to transmit clamping forces produced by means of the clamping bolts (32) to the jaw members (11), the jaw members (11) and the counter support (12) being provided with cooperating engagement means (13, 15), serving to make it possible to place and hold the jaw members (11) in predetermined positions in relation to the counter support (12), wherein the engagement means (13, 15) are arranged to permit each said jaw member (11) to be placed and held in position in relation to the counter support (12) which may be freely selected among a plurality of different predetermined positions;

wherein the engagement means (13, 15) are arranged to permit the jaw members (11) to be placed and held in differently spaced apart positions on the counter support (12).

2. Clamping jaw according to claim 1, wherein the engagement means (13, 15) are arranged to permit each jaw member of said members (11) to be placed and held in positions in which they are facing each other with first ends (17) thereof, as well as in positions in which they are facing each other with second ends (18) thereof, opposite to the first ends (17).

3. Clamping jaw according to claim 2, wherein at their said first and second ends (17, 18), the jaw members (11) are provided with contact surfaces (19, 20) of mutually different shape for application against a profile member (31).

4. Clamping jaw according to claim 3, wherein the engagement means (13, 15) comprise transverse teeth (13) at the rear side of each jaw member (11) and cooperating transverse teeth (15) at the front side of the counter support (12).

5. Clamping jaw according to claim 4, wherein at its front side, the counter support (12) is provided with two flanges (21), projecting in a forward direction therefrom and forming a pair of opposite longitudinal guide surfaces (22) for two opposite longitudinal lateral surfaces (23) of each jaw member (11).

6. Clamping jaw according to claim 5, wherein said clamping jaw comprises locking means (24, 25) for releasably locking the jaw members (11) in positions in which the engagement means (13) of said members are in engagement with the engagement means (15) of the counter support (12).

7. Clamping jaw according to claim 6, wherein said locking means (24, 25) comprise locking means (24), mounted resiliently movable in the jaw members (11), and longitudinal grooves (25), formed in said two flanges (21) of the counter support (12) and serving to receive said resiliently movable locking means.

8. Clamping jaw according to claim 7, wherein the counter support (12) is provided with oblong through holes (27) for the clamping bolts (32).

9. Clamping jaw according to claim 8, wherein each jaw member (11) is provided with two through bores (26) for a clamping bolt (32), located spaced apart in the longitudinal direction of the jaw member.

10. Clamping jaw according to claim 9, wherein, at its rear side, the counter support (12) is provided with a longitudinal groove (29), comprising an inner portion (29A), in which a fixed head (33) of a bolt (32) or a nut threaded on a bolt may be received in a non-rotatable state, and an intermediate portion (29B) of enlarged width for receiving a washer placed on a bolt (32), and an outer portion (29C) of reduced width, forming a free passage for a bolt shank.

11. Clamping jaw according to claim 5, wherein said locking means (24, 25) comprise locking means (24), mounted resiliently movable in the jaw members (11), and longitudinal grooves (25), formed in said two flanges (21) of the counter support (12) and serving to receive said resiliently movable locking means.

12. Clamping jaw according to claim 1, wherein the engagement means (13, 15) are arranged to permit the jaw members (11) to be placed and held in positions in which they are facing each other with first ends (17) thereof, as well as in position in which they are facing each other with second ends (18) thereof, opposite to the first ends.

13. Clamping jaw according to claim 12, wherein at their said first and second ends (17, 18), the jaw members (11) are provided with contact surfaces (19, 20) of mutually different shape for application against a profile member (31).

14. Clamping jaw according to claim 1, wherein the engagement means (13, 15) comprise transverse teeth (13) at the rear side of each jaw member (11) and cooperating transverse teeth (15) at the front side of the counter support (12).

15. Clamping jaw according to claim 14, wherein at its front side the counter support (12) is provided with two flanges (21), projecting in a forward direction therefrom and forming a pair of opposite longitudinal guide surfaces (22) for two opposite longitudinal lateral surfaces (23) of each jaw member (11).

16. Clamping jaw according to claim 1, wherein said clamping jaw comprises locking means (24, 25) for releasably locking the jaw member (11) in positions in which the engagement means (13) of said members are in engagement with the engagement means (15) of the counter support (12).

17. Clamping jaw according to claim 1, wherein the counter support (12) is provided with oblong through holes (27) for the clamping bolts (32).

18. Clamping jaw according to claim 1, wherein each jaw member (11) is provided with two through bores (26) for a clamping bolt (32), located spaced apart in the longitudinal direction of the jaw member.

19. Clamping jaw according to claim 1, wherein at its rear side, the counter support (12) is provided with a longitudinal groove (29), comprising an inner portion (29A), in which a fixed head (33) of a bolt (32) or a nut threaded on a bolt may be received in a non-rotatable state, and an intermediate portion (29B) of enlarged width for receiving a washer placed on a bolt (32), and an outer protion (29C) of reduced width, forming a free passage for a bolt shank.

20. Clamping jaw for a clamping device, adapted to be mounted on a profile member and wherein the clamping jaw (10) is adapted to be applied under pressure against the profile member (31) by means of two transverse clamping bolts (32), placed each on one side of the profile member, clamping jaw (10) being formed by two separate jaw members (11) and a common counter support (12) for each member of said jaw members, located behind them and arranged to transmit clamping forces produced by means of the clamping bolts (32) to the jaw members (11), the jaw members (11) and the counter support (12) being provided with cooperating engagement means (13, 15), serving to make it possible to place and hold the jaw members (11) in predetermined positions in relation to the counter support (12), wherein the engagement means (13, 15) are arranged to permit each said jaw member (11) to be placed and held in position in relation to the counter support (12) which may be freely selected among a plurality of different predetermined positions;

wherein the engagement means (13, 15) are arranged to permit the jaw members (11) to be placed and held in differently spaced apart positions on the counter support (12);

wherein the engagement means (13, 15) are arranged to permit each jaw member of said members s (11) to be placed and held in positions in which they are facing each other with first ends (17) thereof, as well as in positions in which they are facing each other with second ends (18) thereof, opposite to the first ends (17).

21. Clamping jaw for a clamping device, adapted to be mounted on a profile member and wherein the clamping jaw (10) is adapted to be applied under pressure against the profile member (31) by means of two transverse clamping bolts (32), placed each on one side of the profile member, clamping jaw (10) being formed by two separate jaw members (11) and a common counter support (12) for each member of said jaw members, located behind them and arranged to transmit clamping forces produced by means of the clamping bolts (32) to the jaw members (11), the jaw members (11) and the counter support (12) being provided with cooperating engagement means (13, 15), serving to make it possible to place and hold the jaw members (11) in predetermined positions in relation to the counter support (12), wherein the engagement means (13, 15) are arranged to permit each said jaw member (11) to be placed and held in position in relation to the counter support (12) which may be freely selected among a plurality of different predetermined positions;

wherein the engagement means (13, 15) comprise transverse teeth (13) at the rear side of each jaw member (11) and cooperating transverse teeth (15) at the front side of the counter support (12);

wherein at its front side, the counter support (12) is provided with two flanges (21), projecting in a forward direction therefrom and forming a pair of opposite longitudinal lateral surfaces (23) of each jaw member (11).

22. Clamping jaw according to claim 20, wherein said clamping jaw comprises locking means (24, 25) for releasably locking the jaw members (11) in positions in which the engagement means (13) of said members are in engagement with the engagement means (15) of the counter support (12).

23. Clamping jaw according to claim 22, wherein said locking means (24, 25) comprise locking means (24), mounted resiliently movable in the jaw members (11), and longitudinal grooves (25), formed in said two flanges (21) of the counter support (12) and serving to receive said resiliently movable locking means.

24. Clamping jaw according to claim 21, where the counter support is provided with oblong through holes (27) for the clamping bolts (32).

25. Clamping jaw according to claim 21, wherein each jaw member (11) is provided with two through bores (26) for a clamping bolt (32), located spaced apart in the longitudinal direction of the jaw member.

26. Clamping jaw according to claim 21, wherein at a rear side, the counter support (12) is provided with a longitudinal groove (29), comprising an inner portion (29A), in which a fixed head (33) of a bolt (32) or a nut threaded on a bolt may be received in a non-rotatable state, and an intermediate portion (29B) of enlarged width for receiving a washer placed on a bolt (32), and an outer portion (29C) of reduced width, forming a free passage for a bolt shank.

\* \* \* \* \*